United States Patent

[11] 3,569,747

| [72] | Inventor | Vernon H. Siegel<br>Clarence, N.Y. |
|---|---|---|
| [21] | Appl. No. | 746,700 |
| [22] | Filed | July 9, 1968 |
| [45] | Patented | Mar. 9, 1971 |
| [73] | Assignee | Kistler Instrument Corporation<br>Continuation of application Ser. No.<br>471,934, July 14, 1965, now abandoned. |

[54] PIEZOELECTRIC TRANSDUCER
8 Claims, 6 Drawing Figs.

[52] U.S. Cl. .................................................. 310/8.1,
310/8.4, 310/8.7
[51] Int. Cl. .................................................. H01v 7/00
[50] Field of Search .................................................. 310/8.1,
8.4, 8.7

[56] References Cited
UNITED STATES PATENTS
3,045,131  7/1962  Orlacchio .................... 310/8.4

| 3,185,869 | 5/1965 | Shoor | 310/8.4 |
| 3,261,373 | 3/1966 | Ricketts | 310/8.4 |
| 3,283,590 | 11/1966 | Shang | 310/8.4 |
| 3,322,980 | 5/1967 | Faure | 310/8.7 |
| 3,294,988 | 12/1966 | Packard | 310/8.0 |
| 3,397,329 | 8/1968 | Riedel | 310/8.4 |
| 3,400,284 | 9/1968 | Elazar | 310/8.1 |

Primary Examiner—Milton O. Hirshfield
Assistant Examiner—B. A. Reynolds
Attorney—Le Blanc & Shur ABSTRACT: Disclosed is a transducer incorporating a piezoelectric device for converting physical forces into an electrical signal. A high input impedance, low output impedance voltage operated amplifying device, preferably in the form of a P-channel enhancement MOS transistor, is combined with the piezoelectric element and supplied over a conventional single coax or two-wire cable from a remote power supply. The MOS transistor may be connected to the coaxial cable through a junction transistor.

PATENTED MAR 9 1971

INVENTOR
Vernon H. Siegel

BY Le Blanc & Shur
ATTORNEYS

INVENTOR
Vernon H. Siegel
BY
Le Blanc & Shur
ATTORNEYS

PIEZOELECTRIC TRANSDUCER

This application is a continuation of copending application Ser. No. 471,934 filed Jul. 14, 1965.

This invention relates to transducers for converting physical forces into an electrical signal and more particularly to piezoelectric devices of this type suitable for use as accelerometers, as blast and rocket motor pressure monitors, for measuring vibration shock, for use in force gauges, and for a wide variety of other applications involving force measurements. The unit of the present invention is particularly adapted to take advantage of the desirable properties of piezoelectric quartz materials and provides a high level voltage output at an extremely low impedance, making it possible to transmit signals over a single coaxial connector to a remote station at distances of as much as a quarter of a mile or more.

Transducers of the self-generating, piezoelectric type are very popular since they may have a high natural frequency, good rigidity, and offer simple construction. However the signal from these devices is somewhat difficult to handle since the basic output is a charge, normally necessitating the use of high impedance cabling, connections, and amplifiers. The cathode follower was among the first type of amplifier used to follow piezoelectric transducer output signals. The cathode follower has the advantage of possessing a relatively high input impedance (approximately $10^9$ ohms) but requires a voltage input. In the past this voltage input has generally been provided by adding a capacity between the input to the cathode follower and the ground reference. Thus, the input voltage to the cathode follower is equal to the input charge divided by the input source capacity. Usually the input capacity is furnished by the source capacity of the transducer itself along with the capacity of the cable connecting the transducer to the cathode follower amplifier. One of the serious disadvantages attendant to the use of a cathode follower lies in the fact that if the input cable between the transducer and amplifier is lengthened, a decrease in voltage is applied to the cathode follower. That is, the overall voltage gain of the system is seriously dependent upon cable length. Additional problems in the use of cathode followers is the limited low frequency response due to limited input impedance, the fact that the low frequency response is dependent on cable leakage, low voltage amplification (usually about 0.9), the requirement that the cathode follower be located close to the transducer to prohibit voltage attenuation, and finally poor linearity.

Some of the problems in the use of cathode followers may be removed by applying a feedback voltage to the ground lead of the piezoelectric transducer. In this manner, the input cable may be lengthened without severe attenuation although the noise threshold does increase. However this partial solution presents its own problems, including the fact that the transducer must be isolated from ground, the feedback signal must be applied to a large capacitive load requiring large peak current for high frequency response, the low frequency response is still limited by shunt resistance, a triaxial cable is required and the stability of the feedback signal is difficult to maintain.

In order to avoid some of the problems of cathode followers, it was proposed to follow the output signal of the piezoelectric transducer by means of a capacitive feedback or charge amplifier as first disclosed in Swiss Pat. No. 267,431 published Jun. 16, 1950. With this technique, the effective input capacitance appears as the feedback capacity multiplied by substantially the amplifier gain. In this arrangement, changes in source capacity have little effect if the loop gain is high. The low frequency response is improved since source leakage is shunted by this high input capacity and since the voltage across the transducer is maintained near zero by the feedback action of the charge amplifier, little current flows through source leakage. In addition, the charge amplifier has good linearity and good sensitivity as the output voltage depends on the value of feedback capacity which may be made small, stable gain since the output voltage depends mainly on the stability of the feedback capacity which can be made good by proper selection, and finally the charge amplifier presents good frequency response.

While the charge amplifier constitutes a substantial improvement over the earlier cathode follower devices used to follow the output signal of a piezoelectric transducer, the charge amplifier is not without certain disadvantages. These include the fact that although the input gain does not decrease appreciably with increase of input capacity the noise does increase in proportion to capacity increase. Likewise although good low frequency response is achieved in the charge amplifier with source leakage resistance, the bias and thus the DC stability is affected by source leakage. This usually necessitates the use of a feedback resistance in order to maintain the output bias level. Finally, in charge amplifiers the high frequency stability is difficult to maintain because of the initial phase lag due to the capacitive feedback.

All of the known systems previously described suffer from certain common disadvantages in that all of the systems require low leakage cables that do not generate charge signals when flexed. The use of such cables in environments where moisture and mechanical stress is encountered is prohibited. While charge amplifiers have been combined with the transducers, i.e. incorporated in the same package, this requires multiconductor cabling to the power supply, increases the size of the transducer package, limits the temperature environment of the transducer, and makes low frequency response difficult.

In order to avoid the above-mentioned difficulties as well as others, the present invention provides a novel piezoelectric transducer wherein a high input impedance voltage operated amplifying device is combined with the transducer element in the transducer package and supplied over a conventional single coax or two wire cable from a remote power supply. The device of the present invention in addition to eliminating the above-mentioned difficulties provides for static response, permits a decrease in the insulation of the transducer since this does not cause divergent drift of the output, and makes use of cables having an insulation resistance of down to 100,000 ohms. Charge generation due to flexing of the cables does not seriously affect the device and changes in cable capacity do not produce any significant changes in the voltage gain of the system. In addition, the device of the present invention provides a good frequency response (50 kc or more) for large cable capacities (50,000 picofarads or more), the noise of the output signal does not increase with cable length, and at the same time the device permits a transducer temperature environment which may vary from $-300$ to $+300°$ F.

The above characteristics are met by incorporating in a quart crystal package a high input impedance voltage operated transistor and preferably a metal oxide insulated gate transistor commonly referred to as an MOS device. This transistor is connected directly across the output plates of one or more quartz crystal wafers and the device is characterized by a high input resistance typically greater than $10^{14}$ ohms and a low input capacity. Since it is located at the transducer the input capacity to the amplifier is the capacity of the transducer plus the input capacity of the MOS (approximately 4 picofarads). Thus, high transducer voltage sensitivities can be realized since no cable capacities are present between the transducer and the amplifier. The power supply to operate the device is located the remote station and since the load resistance may be located at the remote station also, only two wires or a single coaxial cable suffices to connect the transducer to the remote station.

It is therefore one object of the present invention to provide a novel piezoelectric transducer.

Another object of the present invention is to provide a transducer capable of taking advantage of the optimum properties and characteristics of quartz and similar piezoelectric materials.

Another object of the present invention is to provide a piezoelectric transducer having increased voltage sensitivity.

Another object of the present invention is to provide a piezoelectric transducer having a high output voltage and a low output impedance for coupling to remote monitoring or other output equipment.

Another object of the present invention is to provide a novel transducer amplifier system which makes it possible to monitor all types of force phenomena of relatively low magnitude at remote locations substantial distances from the location of the transducer.

Another object of the present invention is to provide a transducer amplifier combination having good frequency response, one that is substantially independent of the type or length of cable used to connect to a remote power supply, and one which may be used in severe environmental situations.

Another object of the present invention is to provide a novel monitoring system including a local piezoelectric transducer and amplifier combination in conjunction with a remote source, which may be coupled together over substantial distances by means of a conventional single coaxial cable or two wire conductor. This is made possible by connecting the piezoelectric element directly to a high input impedance voltage operated semiconductor located at the source in such a manner as to develop a high voltage output with a low output impedance usable over a wide frequency and temperature range. In the preferred embodiment, the semiconductor or solid state device takes the form of an MOS or insulated gate field effect transistor.

These and further objects and advantages of the invention will be more apparent upon reference to the following specification, claims and appended drawings wherein:

Piezoelectric transducers, because of their ruggedness and other desirable characteristics are widely used for transducing a wide variety of force phenomena into electrical signals. Only a few of the many applications of these devices include use as piezoelectric accelerometers, force gauges, pressure measuring devices, etc. They are used for measuring vibrations, rocket thrusts, thermonuclear and other blast pressures and as strain gauges in many fields and in many environments.

In addition to the difficulties inherent in adapting these charge sources to voltage and current responsive output devices, many of the applications require that the phenomena being measured or detected be monitored from a remote location. For example, when measuring the overpressure of a thermonuclear shock wave, it is highly desirable that the readout equipment which normally does not possess the ruggedness and resistance to damage of the transducer itself be positioned as far as possible from the transducer. In situations of this type, as well as in many other applications, the readout equipment may be most desirably located as much as several thousand feet and more from the piezoelectric transducer. This requires connecting cables of substantial length which cables customarily have a very serious effect on the monitoring system in terms of noise, bandwidth, attenuation, etc. In addition to the often deleterious affects of the coupling cable, the monitoring system must satisfactorily deal with the problem of matching the relatively high impedance of the transducer to the normally much lower impedance of the readout or monitoring device such as an oscilloscope or the like.

Although quartz and other self-generating piezoelectric materials possess many desirable transducer properties including high signal sensitivity so as to make them capable of detecting very small force signals, this has in the past been to a great extent counteracted by the adverse affects of the capacity of the cable normally used to couple the transducer to the readout device or load. As a result, many of the more recent piezoelectric transducers have incorporated ceramic materials exhibiting a higher source capacitance in an attempt to minimize the affects cable capacitance. However, even though these transducers may utilize stacked arrangements of many ceramic elements, the voltage sensitivities of the transducer remain small since the increase in charge or coloumb sensitivity of the piezoelectric source is counteracted by the accompanying increase source capacity. That is, the voltage sensitivity of the transducer as given by the equation $$e = \frac{Q}{C}$$

illustrates that the increase in total charge Q generated by the transducer in response to a given force obtained by incorporating the more charge sensitive ceramic piezoelectric materials is counteracted by the accompanying increase in capacity C of the ceramic transducer materials.

While the system of the present invention is usable with all types of piezoelectric materials including piezoelectric ceramics, it makes possible the utilization of the more desirable quartz as the force responsive material of the transducer. By rendering the system substantially insensitive to cable capacitance, it is possible to obtain increased voltage sensitivities from cheaper and more desirable materials and to transmit signals at elevated voltage or current levels for substantial distances over standard untreated coax or two wire transmission cables.

Figure 1:
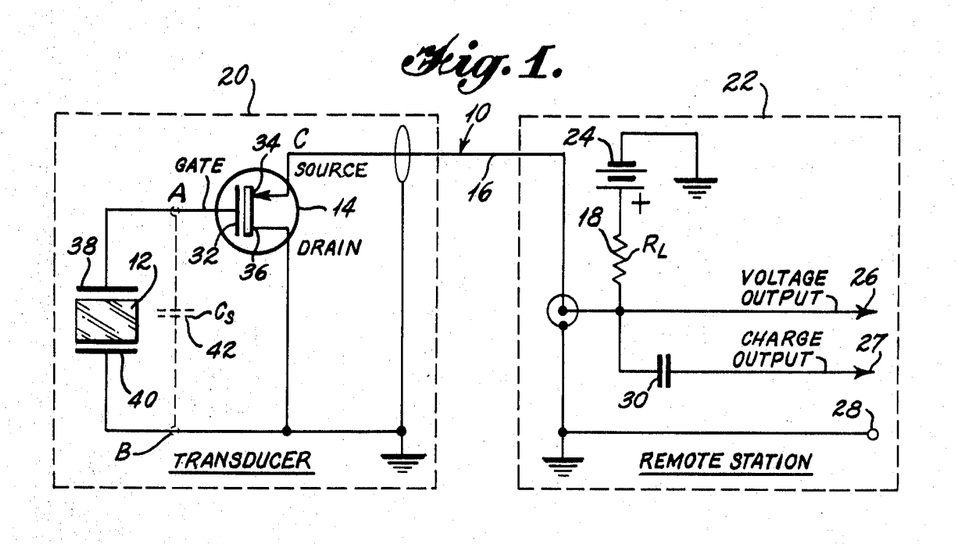
FIG. 1 is a circuit diagram of a piezoelectric transducer and remote source constructed in accordance with the present invention.

Referring to the drawings, FIG. 1 illustrates the overall system of the present invention generally indicated at 10 including as major components a piezoelectric transducer 12, amplifier 14, coupling cable 16 and load resistor 18. The transducer 12 and amplifier 14 are incorporated in a single transducer shielding jacket or package as more fully described below and are located at the source of the force phenomena to be measured as indicated by the dashed line at 20. The signals are transmitted from the transducer package by way of coaxial cable 16 to a remote station 22 which may be situated as much as 2000 feet or more from transducer 12 and amplifier 14. The load impedance 18 labeled $R_L$ may form the internal impedance of the remote station power supply illustrated by the battery 24 which supplies power to transducer amplifier 14 by way of cable 16. A voltage output signal is developed at the remote station across output terminals 26 and 28 to a suitable load device which by way of example only may be an oscilloscope. Alternatively, a charge output is developed at the remote station across terminals 27 and 28 by coupling charge output terminal 27 to voltage terminal 26 by way of a suitable capacitor 30.

An important feature of the present invention resides in the fact that the amplifier 14 comprises a high input impedance voltage operated semiconductor device and in the preferred embodiment consists of a metal oxide insulated gate field effect transistor having a gate electrode 32, a source 34 and a drain 36. These transistors are generally referred to as MOS devices, and may take any one of four possible forms, namely (1) N channel depletion type, (2) P channel depletion type, (3) N channel enhancement type, and (4) P channel enhancement type. These devices are all further characterized by the fact that the conduction between the source and drain electrodes is under the control of an electrostatic field developed at the gate 32 such that the device exhibits an extremely high input impedance (high input resistance and small input capacitance) with the input resistance on the order of $10^{14}$ ohms and higher. While the system of the present invention is operable with field effect semiconductors having an input resistance of as low as $10^{10}$ ohms, the higher input resistance insulated gate or MOS devices are preferred for reasons more fully discussed below.

The piezoelectric transducer 12 which may be of any conventional type, but is preferably a quartz transducer of the type more fully shown in FIG. 6 and described below, may be thought of as comprising a pair of movable plates 38 and 40 which develop a charge Q proportional to the amount of force applied to the piezoelectric elements of the transducer. The transducer 12 is a high impedance device having an internal or source capacitance $C_S$ indicated by dashed lines at 42 which may have a value of anywhere from in the neighborhood of 1 to 50,000 picofarads. Values of from 100 to 1000 picofarads are most common for the piezoelectric transducer source capacitance $C_S$. Since the amplifier 14 is coupled directly to the transducer 12, at the location of the transducer, no cable capacities are present so as to adversely affect the charge developed on transducer plates 38 and 40. That is, the MOS device 14 has an input capacity in the neighborhood of approximately 4 picofarads, so that the input capacity to the amplifier, i.e., the capacity across the transducer 12, is quite small and the input capacity to the amplifier is substantially the source capacity $C_S$. Thus, while the coloumb or charge sensitivity (amount of charge produced by the transducer as a function of force) for the quartz is not as high as for some ceramic materials, the source capacity $C_S$ is correspondingly small and hence the voltage sensitivity $$e = \frac{Q}{C}$$

is quite high. The charge signal across transducer plates 38 and 40 produces an electrostatic field at the gate electrode of amplifier 14 so as to control the source to drain current flow through transistor 14 in series with load resistor (power supply resistance) 18 at the remote station 22.

Figure 2:
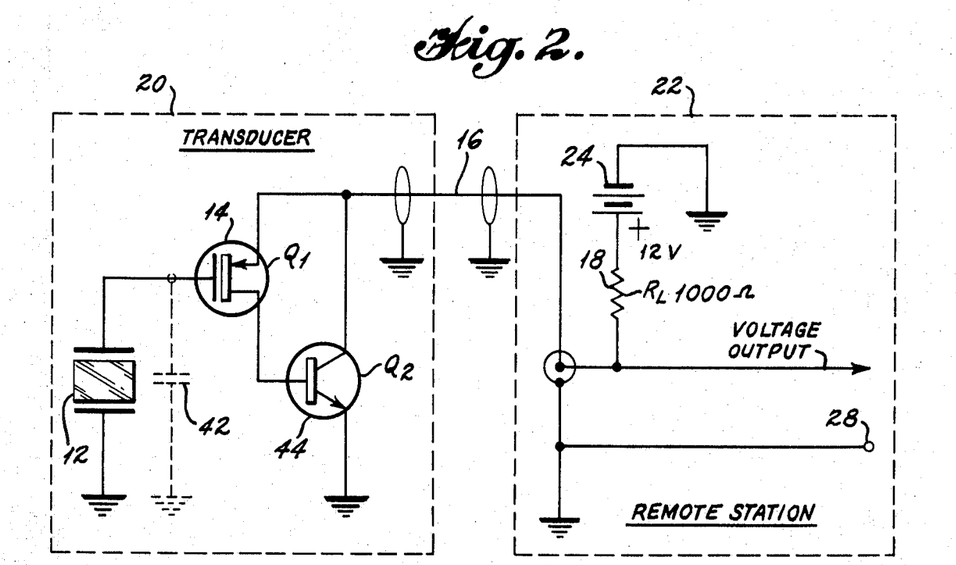
FIG. 2 is a more detailed showing of a preferred arrangement of the transducer and remote source constructed in accordance with the present invention.

While the circuit of FIG. 1 has been found quite satisfactory for many applications, FIG. 2 shows a preferred embodiment having an increased overall voltage gain and a lower output impedance. In FIG. 2, like parts bear like reference numerals and this circuit again includes transducer 12 having internal capacitance 42 and amplifier 14 in the transducer package 20 connected by way of cable 16 to the remote station 22. Load resistor 18 may again comprise the internal impedance of the preferably 12 volt power supply 24. As can be seen, the circuit of FIG. 2 is similar to that of FIG. 1 with the exception that the former incorporates an additional junction transistor 44 labeled $Q_2$. The addition of transistor 44 serves a two-fold effect, namely it increases the overall voltage gain of the circuit and at the same time makes it possible to decrease the output impedance of the transducer package 20. In one embodiment constructed in accordance with the present invention, the circuit of FIG. 2 had a voltage gain on the order of 0.95 and an output impedance across the output of transistor 44 of approximately 50 ohms. This produces a wide band frequency response having an upper limit in excess of 50 kc. with cable capacities of as much as 50,000 picofarads and a low frequency cutoff closely approaching DC. The noise at the output of the circuit is less than 100 microvolts and does not vary with the cable capacity. Linearities of better than 0.01 percent are possible. Typical values for the circuit parameters and components are given in FIG. 2 wherein the field effect transistor 14 may take the form of a conventional MOS manufactured by the General Microelectronics Corporation of Santa Clara, California, identified as Model X1004. Transistor 44 is likewise of a conventional construction and may be of the type identified as 2N3128. It is of course understood that other conventional transistors may be substituted for transistors 14 and 44 and a junction transistor manufactured by the Fairchild Corporation and identified as FSP42 has been successfully utilized for transistor 44.

As mentioned above, it has been previously proposed to incorporate semiconductor devices in the transducer package along with the piezoelectric element. These proposals have included not only the incorporation of tube devices, but the provision of a more or less conventional junction transistor, a field effect semiconductor device in the form of an electrostatic field sensitive resistor or junction diode and even the incorporation of a charge amplifier having a semiconductor input stage. However, all of these proposed devices for incorporation in the transducer package have exhibited one or more serious disadvantages. The triode or other tube devices are perhaps the most impractical due to size and a lack of ruggedness. The relatively low resistance field effect devices suffer the disadvantage of lack of sensitivity and nonlinear frequency response and more importantly do not provide for static response. While the charge amplifier overcame many of these problems, it still retained the very serious disadvantage in that it requires special nonconventional cabling including three or more wires.

The static response offered by the novel circuit of this invention is very important. It is only statically that a piezoelectric transducer can be practically calibrated for all but a few limited applications since dynamic calibration, especially at higher frequencies, imposes severe requirements on the calibrating equipment. For example, dynamically calibrating a pressure sensitive transducer in the high frequency range requires complicated pressure sources and fluid valving devices making the cost prohibitive. Static calibration on the other hand presents a simple method of calibrating the transducer for almost all applications in that a DC output may be derived through the simple expedient of applying one or a series of different weights to the transducer element and recording the DC output.

In order to obtain a static response, it is necessary that the input impedance of the amplifier 14, i.e., input resistance, be at least $10^{10}$ ohms and preferably $10^{11}$ ohms or higher. Through the use of an insulated gate transistor for amplifier 14, it is possible to obtain a time constant of months and even years, such that very good static response is obtained and very accurate static calibration of the system may be readily effected.

Figure 3:
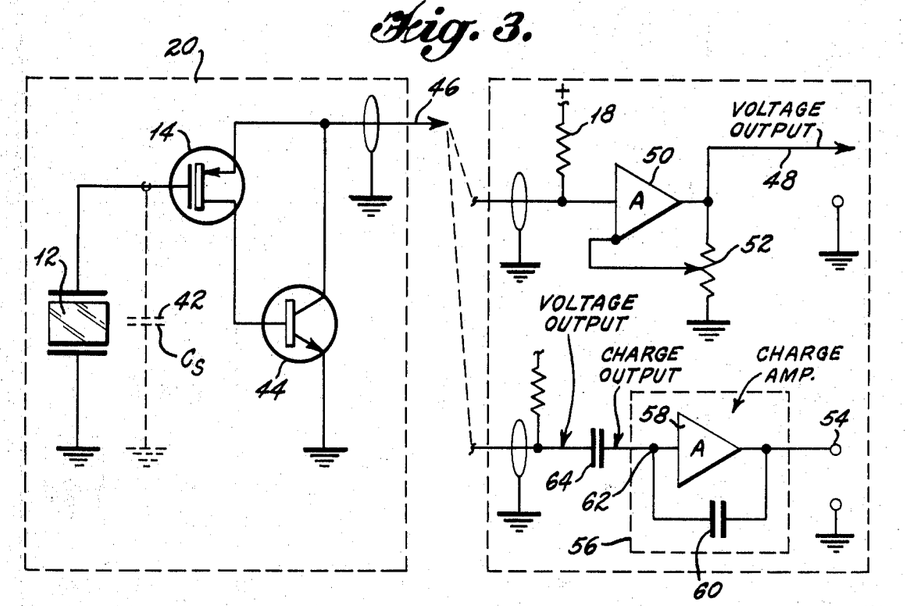
FIG. 3 shows the transducer of FIG. 2 coupled to provide either a voltage output or a charge output or both.

FIG. 3 illustrates the versatility of transducer package 20 of FIG. 2, wherein the output terminal 46 of the transducer package may be coupled to a voltage output terminal 48 by way of a conventional variable gain amplifier 50 having a gain adjustment potentiometer 52 or to a voltage output terminal 54 through a charge amplifier indicated by the dashed box 56. The charge amplifier 56 includes the usual high gain and preferably direct coupled amplifier 58 heavily fed back through a capacitor 60, such that its input terminal 62 constitutes a virtual zero potential point or ground. By connecting output terminal 46 of the transducer package to the charge amplifier input terminal 62 by way of capacitor 64, charge is delivered to the charge amplifier 56 which in turn develops a voltage output at 54 proportional to the transducer signal. Thus, it can be seen that the transducer package 20 of the present invention is fully compatible with existing amplifying devices so as to be capable of supplying an electrical transducer following signal to all types of output equipment currently used to monitor, detect or record force phenomena.

As previously mentioned, the MOS device incorporated in the circuit of the present invention may be any one of four different types, i.e., negative or positive depletion type or negative or positive enhancement type. In FIGS. 1—3, the circuit of the present invention is illustrated and described in conjunction with an insulated gate transistor 14 of the P channel enhancement type. This type of MOS device is preferred since it makes possible the use of a positive power supply 24 and thus the circuit is more compatible with current aerospace equipment wherein positive power supplies are most readily available. It is to be understood, however, that the circuits of FIGS. 1—3 are equally applicable wherein an N channel enhancement type MOS device is utilized for the amplifier transistor 14. However, in such a case, a negative power supply source is required.

On the other hand, depletion type MOS devices have been found not to be satisfactory for operation in the circuits of FIGS. 1—3. This is because the depletion types have the characteristic that current will flow from the source electrode to the drain electrode with zero potential applied between the gate and source. Referring to FIG. 1, this would result in a voltage appearing between point A and point B for normal operation of the circuit. As the insulation of the transducer decreases due to increasing temperature, current tends to flow from point A to point B through the transducer and gradually the voltage at point A and point C approaches the voltage at point B, cutting off a depletion device.

The enhancement devices, on the other hand, require a significant potential to exist between point A and point C for conduction to occur between point C and B. Typically the voltage from point A relative to point C may be the same for the circuit of FIG. 1 as that between point B and point A. Thus, the voltage at point A in FIG. 1 may be at ground potential as is the potential of the drain. Thus, no potential exists across the transducer 12 in the absence of force applied to the transducer, so that if the resistance of the transducer decreases with temperature, no change in the conduction between point C and point B occurs and the potential at point C remains stable. Thus, in the circuit of FIGS. 1—3, the output signal bias of the enhancement type MOS does not drift as the insulation resistance of the transducer decreases, but in fact even becomes more stable.

Figure 4:
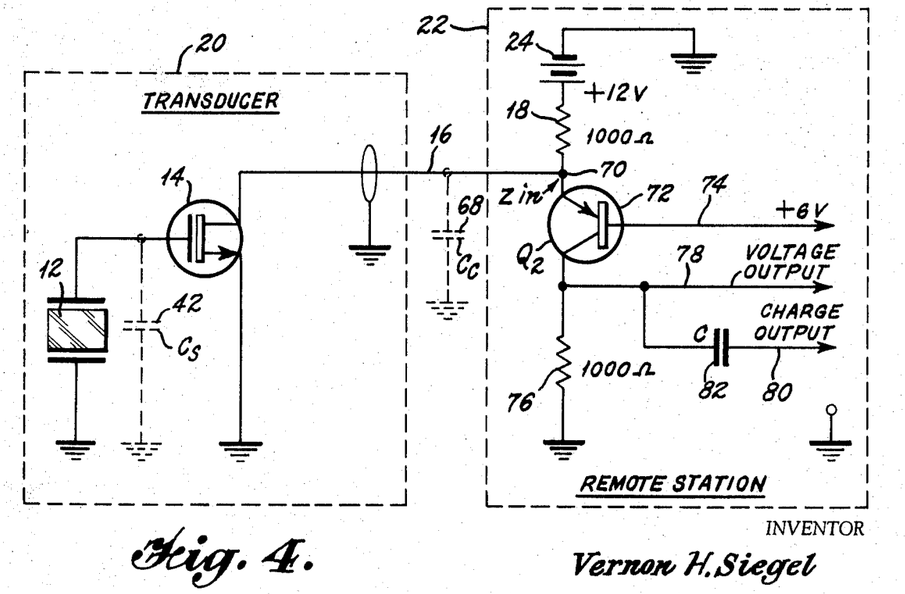
FIG. 4 is a circuit diagram showing a modified embodiment of the present invention where the transducer acts as a current rather than a voltage source.

It is possible to utilize a depletion MOS device in the circuit of the present invention if the transducer acts as a current source and if appropriate modifications are made at the remote station. Such a circuit arrangement is illustrated in FIG. 4 with like parts again bearing like reference numerals. This circuit includes the transducer 12 having internal capacitance 42 directly coupled to amplifier 14 which in this embodiment takes the form of an N channel depletion MOS. It is, of course, understood that the N channel depletion type is illustrated because of its usability in conjunction with a positive power supply, but that the circuit of FIG. 4 is equally operable if a P channel depletion device is substituted for the N channel depletion device illustrated in that FIG. The use of a current source for the transducer 20 is superior to a voltage source in that it offers less amplitude attenuation of higher frequencies from the cable capacity 68. In FIG. 4, the output of the transducer package 20 is connected by way of cable 16 (having cable capacitance 68) to a current summing junction 70 in the remote station 22. Junction 70 is common with the source 16 and the emitter electrode of a junction transistor 72. The base of transistor 72 is connected to a 6 volt power supply by way of lead 74, while the transistor collector is connected through a 1000 ohm resistor 76 to ground. Transistor 72 constitutes a low impedance input for the current source transducer package 20, and develops a voltage output between output terminal 78 and ground or a charge output between output terminal 80 and ground. This latter terminal is connected to the voltage output terminal 78 through capacitor 82 in a manner similar to that illustrated in FIG. 1.

Figure 5:
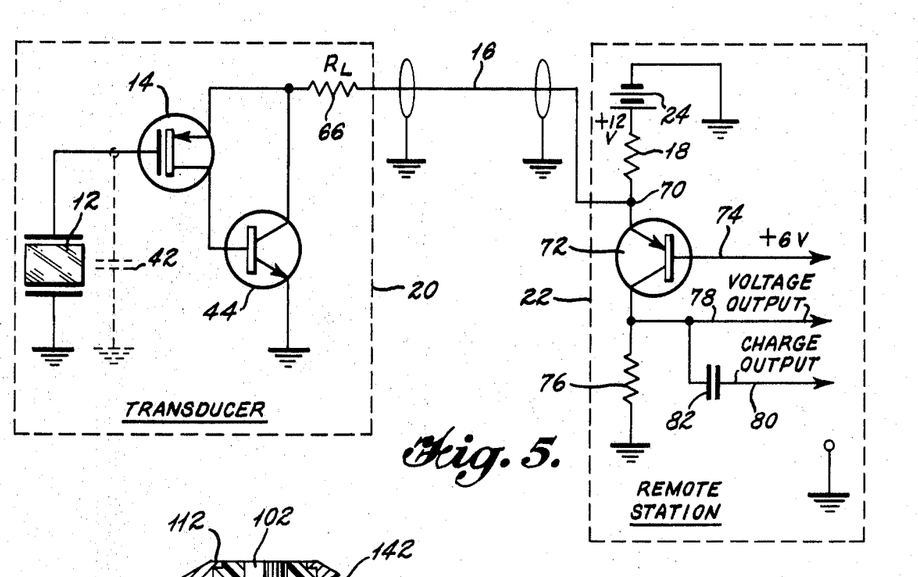
FIG. 5 is a circuit diagram of a further modified embodiment similar to FIG. 4 in that the transducer acts as a current source.

FIG. 5 shows a further modified circuit construction in accordance with the present invention with like parts again bearing like reference numerals. In FIG. 5, a P channel enhancement type device is employed with a load resistance 66 contained within the transducer package 20. The resistance 66 connects the normal voltage source as provided by the transducer package 20 of FIG. 3, to a current source. Transistor 44 improves linearity and gain. The transducer package 20 again acts as a current source supplying a signal to the current summing node 70 of low input impedance transistor 72. Summing node 70 is held at substantially a zero reference point by feedback in a well known manner. A charge output is again available at output terminal 80 against ground and the voltage output is available at terminal 78 as in the previous embodiments. It is further understood that the current source circuits of FIGS. 4 and 5 as with the circuits of FIGS. 1 and 3 are fully compatible with existing transducer equipment and may be used to supply a conventional variable gain amplifier such as amplifier 50 of FIG. 3 or a charge amplifier such as amplifier 56 of that same FIG.

Figure 6:
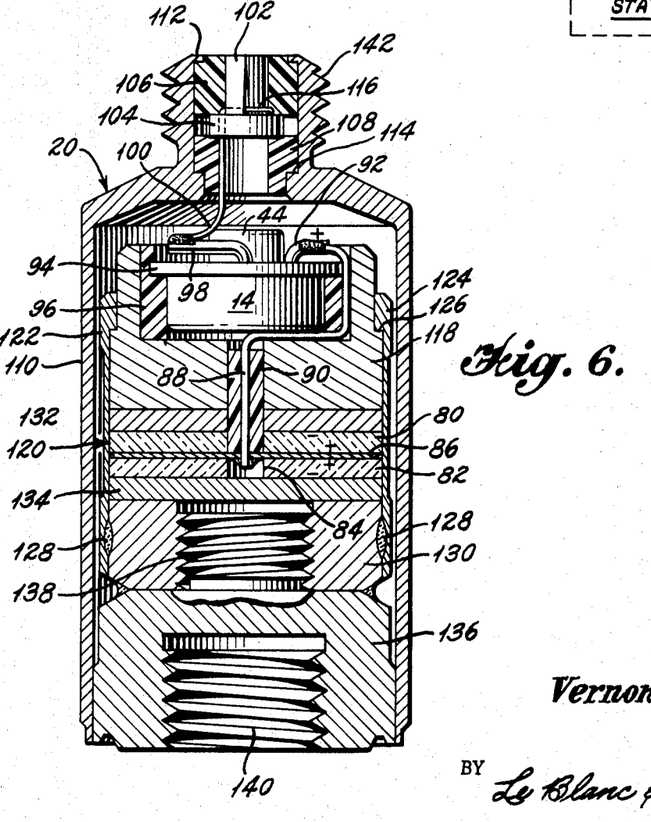
FIG. 6 is a vertical cross section through a piezoelectric transducer constructed in accordance with the present invention and incorporating the electrical features of the preferred embodiment of FIG. 2.

FIG. 6 is a vertical cross section through the transducer package 20 constructed in accordance with the present invention and incorporating the electronics illustrated in FIG. 2. The transducer is of circular cross section and comprises a pair of quartz wafers 80 and 82 each of generally circular configuration and each provided with a central aperture such as that illustrated at 84. Positioned between the quartz wafers and in good electrical contact with the positive charge developing surface of each wafer is an active electrode 86 in the form of a thin copper or gold disc. Soldered or otherwise suitably connected in electrical contact with the disc 86 is a conductive lead 88 received in insulating sleeve 90 and passing upwardly around MOS amplifier 14 to one of the amplifier terminals, i.e., terminal 92, connected to the gate electrode of the insulated gate transistor 14. This transistor is in turn coupled in the manner illustrated in FIG. 2 to a second or junction transistor 44 illustrated in FIG. 6. Transistor 14 supports transistor 44 and is in turn received by the flange 94 on the transistor can in an insulating sleeve 96. Pin 98 of transistor 14 connected to the MOS source electrode is coupled by way of lead 100 to a female connector pin 102. This connector pin is provided with an annular flange 104 squeezed between a pair of insulating sleeves (preferably of Teflon) 106 and 108. Once the female pin and retaining sleeves 106 and 108 have been inserted in the transducer case or jacket 110, the end of the jacket is turned over, as at 112, to tightly retain female coaxial connector pin 102 under stress between the sleeves, the sleeve 108 being formed with a shoulder 114 bearing against a similar shoulder formed in the jacket 110. The end of transistor lead 100 is preferably curled around the pin and soldered thereto, as illustrated at 116.

Sleeve 96 receiving the MOS device 14 is made of suitable insulating material, such as nylon, and is in turn received in a suitable cavity in the end of a seismic mass 118 forming part of a preloaded quartz assembly, generally indicated at 120. A stainless steel preloading sleeve 122 is provided with an enlarged end 124 received over shoulder 126 of the seismic mass and the other end of the preloading sleeve is preferably spot welded, as at 128, to the base 130 of the quartz assembly. Finally, the quartz assembly includes a pair of stainless steel temperature-compensation discs 132 and 134, one on each side of the stacked quartz wafers 180 and 182. During assembly the quartz wafers are preferably aligned with their optical axes in the same planes, so that they uniformly expand and contract under the influence of temperature variations to which the transducer is subjected. Stainless steel discs 132 and 134 further help to minimize excessive stresses built up in the crystals as a result of temperature variations by more nearly matching the temperature coefficients of the quartz wafers to the adjacent metal materials forming the seismic mass 118 and the quartz assembly base 130. In addition, stainless steel discs 132 and 134 constitute ground electrodes for the quartz wafers, which electrodes are grounded to the jacket 110 through the preloading sleeve 122 and assembly base 130 by way of transducer base 136. This latter is threaded into the quartz assembly base 130, as illustrated at 138, and is in turn internally threaded at 140 for mounting the entire transducer package on the element to be tested or monitored. This latter base, i.e., transducer base 136, is suitably secured to the lower end of jacket 110. The upper end of the jacket is externally threaded, as at 142, for connection to the outside or ground wire of a suitable coaxial cable connector such that an output voltage signal is developed between jacket 142 (ground) and female coaxial connector pin 102.

It is apparent from the above that the present invention provides a novel transducer assembly incorporating several important commercial advantages over known constructions. In the preferred embodiment of the present invention, the transducer package is capable of producing an output voltage at the female connector pin 102 of ±5 volts independent of cable capacity with a linearity as good as .01 percent. The overall voltage gain of the transducer package is approximately .95 with a high frequency cutoff of greater than 300 kc. when the transducer package is used without a cable (connected directly to an oscilloscope or other output device) and with a high frequency cutoff of about 50 kc. when used in conjunction with a .05 microfarad cable capacitance. It makes possible low output impedances in the neighborhood of from 50—100 ohms at a high voltage level output through the use of a single coaxial connector to a remote source. The device is of relatively small size and drives long cables over a wide frequency range at a low noise level. When the transducer package is used in conjunction with cables, it renders the system completely insensitive to cable flexure and to cable moisture, which heretofore affected other known amplifier constructions. It further importantly improves over the charge amplifier arrangement by making possible the direct incorporation of an amplifier in the transducer package, which amplifier may at the same time be powered from a remote source over a two-wire or single coaxial conductor—which is not the case with a charge amplifier incorporated in a transducer package which requires three or more wires for remote power. Important advantages distinguishing the device of the present invention over other transistorized transducer packages or packages employing field effect semiconductive devices are the good static response (time constants of up to years), extreme voltage sensitivity at high voltage levels, and almost linear frequency response over a wide range. At the same time, the device of the present invention retains the optimum features of small size and weight and ruggedness attendant to piezoelectric materials and semiconductive amplifiers. The device makes possible the optimum combination of a transistor amplifier with a piezoelectric force sensor and is particularly suited for use with quartz crystals. It is to be understood, however, that while particularly adapted for use in conjunction with quartz, the device of the present invention may be utilized with any other conventional piezoelectric material, including Rochelle salts, and the ceramic materials, such as barium titanate and the like. FIG. 2 illustrates the preferred embodiment of the present invention wherein the transducer package acts as a voltage source and utilizes a P channel enhancement MOS fully compatible with the positive power supplies most usually available in current aerospace equipment. As previously mentioned, however, the circuits of FIGS. 1—3 involving a voltage source are fully applicable for use in conjunction with N channel enhancement devices where negative power supplies are available. Likewise, almost all of the advantages of the present invention may be obtained through the use of either N or P channel depletion MOS devices through the operation of the transducer package as a current source and the provision of a low impedance input at the remote station, preferably in the form of a current summer. Where slightly lower voltage gains, slightly higher output impedances (500—2000 ohms) and some gain variation with temperature can be tolerated, transistor 44 in the transducer package may be eliminated and a more simplified circuit such as that shown in FIG. 1 utilized.

Other important features of the present invention include the fact that the device resembles the familiar potentiometer of high load strain gauge instruments fully compatible with these and associated equipment. The devices of the present invention require only normal insulation resistance levels and their outputs drive existing coaxial cables or regular land lines. Cable capacitance does not attenuate the low impedance output signals from the device of the present invention and cable lengths of thousands of feet are practical in many instances. Motion-generated electrostatic cable noise does not affect the low impedance voltage signals and the sever capacitance associated with long cables does not increase the system noise. The high-level, low-impedance voltage signals are transmitted over great distances without appreciable degradation. This feature makes possible the detection of minute movements of remote test stands. In fact the high level voltages often do not need amplification. The unit connects directly to meters, analyzers, recorders or oscilloscopes and is compatible with either charge or voltage amplifiers. It eliminates cable noise, attenuation and insulation problems, and measures fractional G signals at remote test stands. A standardized exact 10 millivolt per G voltage sensitivity is obtainable along with a high mounted resonant frequency (40,000 cycles per second), a wide operating temperature range and a remarkable linearity, repeatability and stability. These are coupled with miniature size, light weight, hermetic sealing, and conventional microdot connectors in conjunction with rigid quartz elements and mechanical isolation provided by an inner preload sleeve construction virtually eliminating the package sensitivity to the temperature, torque, force, strain, pressure and sound.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

I claim:

1. A piezoelectric transducer comprising a conductive metal electrostatic shielding jacket, a plurality of quartz wafers in said jacket with their optical axes aligned in the same plane, a seismic mass in said jacket, and a preloading sleeve in said jacket surrounding said wafers and mass and applying a preloading force to said quartz wafers, a P-channel enhancement MOSFET in said jacket having gate, drain and source electrodes, means in said jacket coupling said quartz wafers across the gate and drain electrodes of said MOSFET, a junction transistor in said jacket having a base, emitter and collector, means coupling the output of said MOSFET to the base of said junction transistor, and a coaxial cable connector on said jacket connected across the emitter-collector circuit of said junction transistor.

2. A transducer according to claim 1 including a load impedance in said jacket coupling said junction transistor to said cable connector.

3. An instrument transducer comprising a housing, a piezoelectric device in the housing for producing an electrical signal when deformed from a normal condition thereof, means movable in response to a physical input to the transducer for deforming said device from its normal condition so that the device generates an electrical signal having a value indicative of the value of said input, active circuit means in the housing of such type to require energization thereof from externally of its housing coupled to said device for receiving generated signals from the device and for operating upon the generated signals in a predetermined manner to provide transducer output signals, and energization and transducer output signal connector terminal means carried by the housing and including only two terminal elements each of which is conductively connected to separate locations in said circuit means.

4. In combination with a transducer according to claim 3, a coaxial cable connected at one end thereof to the transducer connector terminal elements, a signal readout device coupled to the other end of the cable for receiving output signals from the transducer, and power supply means connected across the cable between the transducer housing and the readout device.

5. The combination according to claim 4 wherein the transducer circuit means has input terminals coupled across the piezoelectric device and output terminals coupled across the coaxial cable, the circuit means being arranged so that the voltage across the output terminals follows substantially a voltage applied across the input terminals thereof and so that the circuit means appears to define an open circuit between the input and output terminals thereof.

6. In a transducing device having a piezoelectric element mounted within a housing, the combination comprising an active circuit energized from externally of said housing for coupling the piezoelectric element to a low impedance coaxial line, the circuit including input terminal means and output terminal means, means for connecting the input terminal means to the piezoelectric element for supplying signals derived from the element to the circuit, the circuit being arranged so that a voltage at the output terminal means follows substantially the value of a signal applied to the input terminal means and so that the circuit appears to define an open circuit between the input and output terminal means, the circuit being mounted within the housing, and a two-terminal coaxial connector mounted on the housing and connected within the housing across the circuit output terminal means.

7. The combination according to claim 6 including a low impedance coaxial line connected to said connector at one end thereof, and a high impedance potential source coupled across the other end of the line for energizing the circuit, the output signal of the transducing device being derived across the coaxial line.

8. A piezoelectric transducer comprising a jacket, a piezoelectric element in said jacket, a P-channel enhancement MOSFET in said jacket having gate, drain and source electrodes, means coupling said piezoelectric element to the gate and drain electrodes of said MOSFET, a two-wire cable connector on said jacket, means in said jacket coupling said connector to the source and drain electrodes of said MOSFET, and a bipolar transistor in said jacket coupling said MOSFET to said cable connector, said bipolar transistor having an emitter, collector and base, said collector being coupled to said MOSFET source electrode and said base being coupled to said MOSFET drain electrode.

UNITED STATES PATENT OFFICE
CERTIFICATE OF CORRECTION

Patent No. 3,569,747                    Dated March 9, 1971

Inventor(s)  Vernon H. Siegel

It is certified that error appears in the above-identified patent and that said Letters Patent are hereby corrected as shown below:

Column 2, line 48, "quart" should read -- quartz --; line 60, "located the" should read -- located at the --. Column 3, line 58, after "measuring" insert -- the thrust developed by a rocket engine or when measuring --. Column 4, line 8, before "cable" insert -- of --. Column 9, line 67, "sever" should read -- severe --.

Signed and sealed this 9th day of November 1971.

(SEAL)
Attest:

EDWARD M. FLETCHER, JR.                 ROBERT GOTTSCHALK
Attesting Officer                       Acting Commissioner of Pate